US008521831B2

(12) United States Patent
Muto

(10) Patent No.: US 8,521,831 B2
(45) Date of Patent: *Aug. 27, 2013

(54) DATA PROCESSING APPARATUS, DATA INPUT CONTROL METHOD THEREOF, INFORMATION PROCESSING DEVICE, AND PROGRAM FOR IMPLEMENTING THE METHOD

(75) Inventor: Shin Muto, Kawasaki (JP)

(73) Assignee: Canon Kabushiki Kaisha (JP)

( * ) Notice: Subject to any disclaimer, the term of this patent is extended or adjusted under 35 U.S.C. 154(b) by 172 days.

This patent is subject to a terminal disclaimer.

(21) Appl. No.: 12/967,709

(22) Filed: Dec. 14, 2010

(65) Prior Publication Data

US 2011/0085206 A1    Apr. 14, 2011

Related U.S. Application Data

(63) Continuation of application No. 11/463,938, filed on Aug. 11, 2006, now Pat. No. 7,877,499.

(30) Foreign Application Priority Data

Aug. 31, 2005    (JP) .................................. 2005-252341

(51) Int. Cl.
G06F 15/167 (2006.01)
(52) U.S. Cl.
USPC ......................................... 709/213; 709/220
(58) Field of Classification Search
USPC .................................................. 709/213, 220
See application file for complete search history.

(56) References Cited

U.S. PATENT DOCUMENTS 7,310,416 B1 * 12/2007 Henderson ............... 379/142.04
2009/0093923 A1 * 4/2009 Owens ........................... 701/29

FOREIGN PATENT DOCUMENTS

| JP | 7-314798 A | 12/1995 |
| JP | 09-248953 A | 9/1997 |
| JP | 2004-021576 A | 1/2004 |
| JP | 2004086558 A | 3/2004 |
| JP | 2004-185239 A | 7/2004 |
| JP | 2004-194284 A | 7/2004 |
| JP | 2004-078670 A | 11/2004 |

OTHER PUBLICATIONS

Japanese Office Action issued in counterpart application No. JP2005-252341, dated May 8, 2012.
Controller Firmware Technology of High-Speed Color Printer Controller, OKI Technical Review, Apr. 1, 2003, Issue 194 vol. 70, No. 2, pp. 46-51(English Translation).
Controller Firmware Technology of High-Speed Color Printer Controller, OKI Technical Review, Apr. 1, 2003, Issue 194 vol. 70, No. 2, pp. 46-51(original document in Japanese).
Office Action issued in corresponding Japanese Appln No. 2005-252341, dated May 23, 2011.
Corresponding Japanese Office Action issued in JP2005-252341 on Sep. 6, 2011.

* cited by examiner

*Primary Examiner* — Tammy Nguyen
(74) *Attorney, Agent, or Firm* — Rossi, Kimms & McDowell LLP

(57) ABSTRACT

A data processing apparatus capable of transmitting externally received data to a corresponding information processing device even in a case where a plurality of information processing devices are mountable to the data processing apparatus. First device identification information for identifying an information processing device connected to the data processing apparatus is obtained from the information processing device, and first data is received from an external apparatus. When the first device identification information and second device identification information added to the first data match each other, the first data is transmitted to the information processing device connected to the data processing apparatus.

18 Claims, 8 Drawing Sheets

DATA PROCESSING APPARATUS, DATA INPUT CONTROL METHOD THEREOF, INFORMATION PROCESSING DEVICE, AND PROGRAM FOR IMPLEMENTING THE METHOD

CROSS REFERENCE TO RELATED APPLICATION

This is a continuation of and claims priority from U.S. patent application Ser. No. 11/463,938 filed Aug. 11, 2006, the content of which is incorporated herein by reference.

BACKGROUND OF THE INVENTION

1. Field of the Invention

This invention relates to a data processing apparatus, a data input control method thereof, an information processing device, and a program for implementing the method, and more particularly, to a data processing apparatus to which at least one information processing device can be connected, a data input control method thereof, the information processing device, and a program for implementing the method.

2. Description of the Related Art

Among data processing apparatuses including an image forming apparatus such as a printer and a multifunctional printer, some of them are each provided with one or more extended slots or the like in an apparatus main body, so that a new or novel function can be easily added thereto. Each extended slot is composed of a connector provided on a controller section in the apparatus main body and a slot hole formed in a rear face of the main body. By inserting an information processing device such as an expansion card into a desired extended slot, the controller section of the data processing apparatus is connected to a controller section of the information processing device, so that a new or novel function can be added to the data processing apparatus. As examples of the expansion card, there can be mentioned "a wireless LAN card", "a print server card", "a USB (Universal Serial Bus) host card", "a PDL (Page Description Language) controller card", and so on.

As the data processing apparatus comes to have more sophisticated functions and comes to be more multifunctional by being provided with new functions, software for controlling the functions has also become complicated and large scaled. Consequently, there often have occurred cases where software upgrading is needed in order to cope with trouble due to software bugs and with the new functions.

As an example of a data processing apparatus for upgrading a software running thereon, there has been known a data processing apparatus that downloads a new software for the upgrade from a host computer on a network via a communication means. The data processing apparatus develops the downloaded software in a RAM (Random Access Memory) to rewrite software stored in a flash memory, whereby the software can be easily upgraded (see, for example, Japanese Laid-open Patent Publication (Kokai) No. H07-314798).

Another method has been proposed in which software to be used in an engine section of a data processing apparatus is downloaded via a download port of a controller section of the apparatus (see, for example, Japanese Laid-open Patent Publication (Kokai) No. 2004-078670).

In the aforesaid conventional data processing apparatus, when an information processing device connected to a desired extended slot can be identified, the above-described methods are applicable for rewriting software used in the controller section, the engine section, and so on of the data processing apparatus in relation to the information processing device mounted thereon.

However, there are a large variety of information processing devices connectable to extended slots of such data processing apparatus, and information processing devices having a new or novel function are sometimes commercialized after commercialization of the data processing apparatus. Therefore, it is difficult to identify an information processing device connected to a desired extended slot.

Therefore, in order to download, via the data processing apparatus, software necessary for operation of a desired information processing device connected to the extended slot, the data processing apparatus is required to identify in advance downloadable software/data for use in all such information processing devices connectable to the data processing apparatus.

Furthermore, in the case of an information processing device which is mountable with information processing devices of a plurality of kinds or mounted with information processing devices made available after shipment of the data processing apparatus, it is difficult to specify which of the information processing devices is a transmission destination of download data.

SUMMARY OF THE INVENTION

It is an object of the present invention to provide a data processing apparatus capable of transmitting externally received data to a corresponding information processing device even in a case where a plurality of information processing devices are mountable to the data processing apparatus, and to provide a data input control method of the data processing apparatus, the information processing device, and a program for implementing the method.

To attain the above objects, in a first aspect of the present invention, there is provided a data processing apparatus to which at least one information processing device is connectable, comprising a device identification information obtaining unit that obtains, from the information processing device connected to the data processing apparatus, first device identification information for identifying the information processing device, a data reception unit that receives first data from an external apparatus, and a data transmission unit that transmits the first data received by the data reception unit to the information processing device connected to the data processing apparatus when the first device identification information obtained by the device identification information obtaining unit and second device identification information added to the first data received by the data reception unit match each other.

To attain the above objects, in a second aspect of the present invention, there is provided a data input control method of a data processing apparatus to which at least one information processing device is connectable, the method comprising a device identification information obtaining step of obtaining, from the information processing device connected to the data processing apparatus, first device identification information for identifying the information processing device, a data reception step of receiving first data from an external apparatus, and a data transmission step of transmitting the first data received in the data reception step, to the information processing device connected to the data processing apparatus when the first device identification information obtained in the device identification information obtaining step and second device identification information added to the first data received in the data reception step match each other.

To attain the above objects, in a third aspect of the present invention, there is provided an information processing device connectable to a data processing apparatus, comprising a storage unit that stores device identification information for identifying the information processing device and data identification information for identifying receivable data, a transmission unit that transmits the device identification information to the data processing apparatus, a determining unit that determines whether or not data received from the data processing apparatus is the receivable data, based on data identification information added to the received data and the data identification information stored in the storage unit, and a data storage unit that stores the received data in a case where the received data is the receivable data.

To attain the above objects, in a fourth aspect of the present invention, there is provided a computer-readable program for causing a computer to execute the data input control method in the second aspect of the present invention.

The above and other objects, features, and advantages of the invention will become more apparent from the following detailed description taken in conjunction with the accompanying drawings.

DETAILED DESCRIPTION OF THE PREFERRED EMBODIMENTS

The present invention will now be described in detail with reference to the drawings showing a preferred embodiment thereof. It should be noted that the relative arrangement of the components, the numerical expressions and numerical values set forth in these embodiments do not limit the scope of the present invention unless it is specifically stated otherwise.

The present invention will now be described in detail below with reference to the drawings showing a preferred embodiment thereof.

Figure 1:
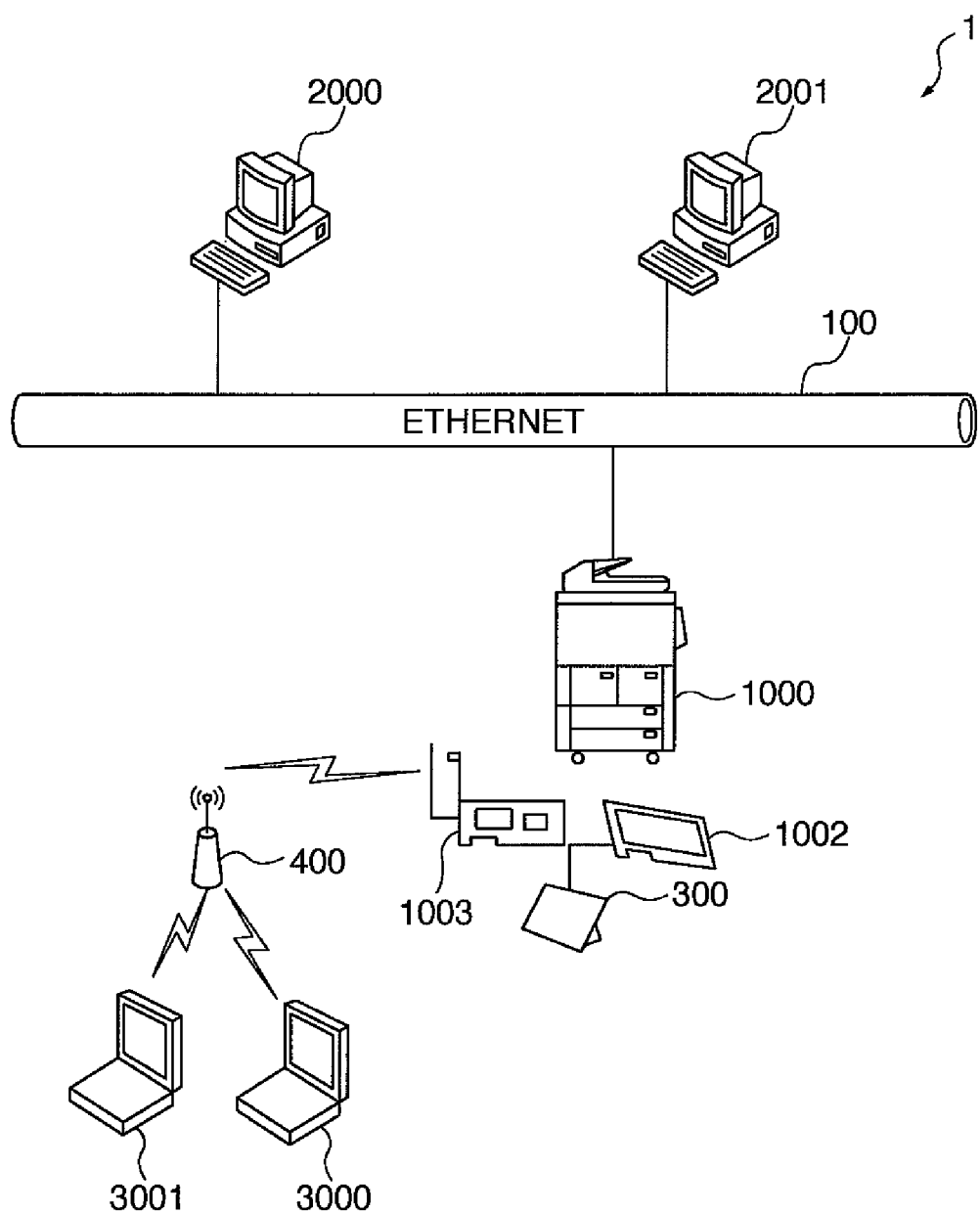
FIG. 1 is a view showing the whole configuration of a network system including a data processing apparatus according to an embodiment of the present invention.

FIG. 1 is a view showing the whole configuration of a network system including a data processing apparatus according to the embodiment of the present invention.

In FIG. 1, an image forming apparatus 1000 provided in a network system 1 is a multifunctional printer to which the data processing apparatus according to the embodiment of the present invention is applied. The image forming apparatus 1000 operates to perform in a complex manner a scanner function of reading an image from an original, a printer function of forming an image on a sheet, a copy function of forming an image read from an original on a sheet, and so on.

The image forming apparatus 1000 is connected to the Ethernet (registered trademark) 100 via a network interface, not shown. The image forming apparatus 1000 is communicable with the host computers 2000, 2001 by being connected to the host computers 2000, 2001, which are connected via the network interface to the Ethernet 100.

Furthermore, the image forming apparatus 1000 includes a plurality of EXP I/Fs (extended slots) adapted to be mounted with expansion cards (information processing devices) providing predetermined functions so that new or novel functions may be easily added to the image forming apparatus 1000. In this embodiment, an expansion card 1002 providing a USB interface and an expansion card 1003 providing a wireless LAN interface are mounted to the EXP I/Fs.

The expansion card 1002 is connectable to various kinds of peripheral devices via a USB (Universal Serial Bus). Therefore, the image forming apparatus 1000 in which the expansion card 1002 is mounted is capable of having an expanded function such as, for example, a user authentication function by using an IC card reader 300 connected thereto via the USB.

The expansion card 1003 is connectable to a wireless LAN access point 400 by wireless communication. Therefore, the image forming apparatus 1000 in which the expansion card 1003 is mounted is capable of communicating with host computers 3000, 3001 wirelessly connected thereto via the wireless LAN access point 400.

The expansion card 1002 and the expansion card 1003 are detachably mounted to the image forming apparatus 1000, and can be replaced by other expansion cards.

Figure 2:
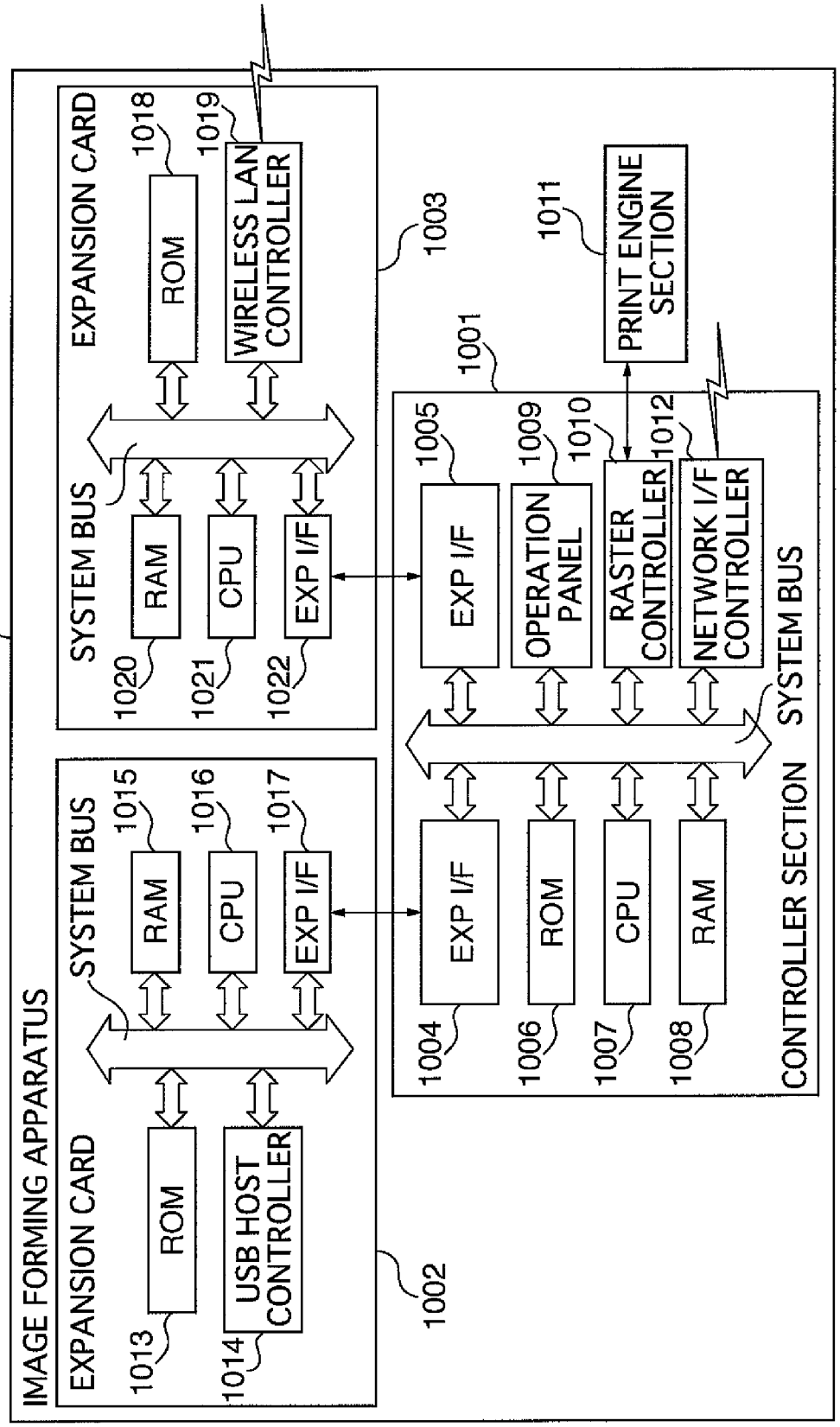
FIG. 2 is a block diagram showing the internal configuration of an image forming apparatus in the network system shown in FIG. 1.

FIG. 2 is a block diagram showing the internal configuration of the image forming apparatus 1000 in the network system 1 shown in FIG. 1. In FIG. 2, only the configuration of the image forming apparatus 1000 relating to the present invention is shown, and illustrations of others are omitted.

In FIG. 2, it is assumed that in the image forming apparatus 1000, two kinds of expansion cards, namely, the expansion card 1002 being a USB host card and the expansion card 1003 being a wireless LAN card are mounted in EXP I/Fs, not shown. Therefore, the image forming apparatus 1000 is comprised of a controller section 1001, a print engine section 1011, the expansion card 1002, and the expansion card 1003.

The controller section 1001 incorporates therein control devices for controlling the image forming apparatus 1000. A CPU 1007 carries out overall control of access to the control devices connected to a system bus based on a control program stored in a program area of a ROM 1006. Further, based on the control program, the CPU 1007 outputs an image signal as output information to the print engine section 1011 connected thereto via a raster controller 1010.

Figure 3:
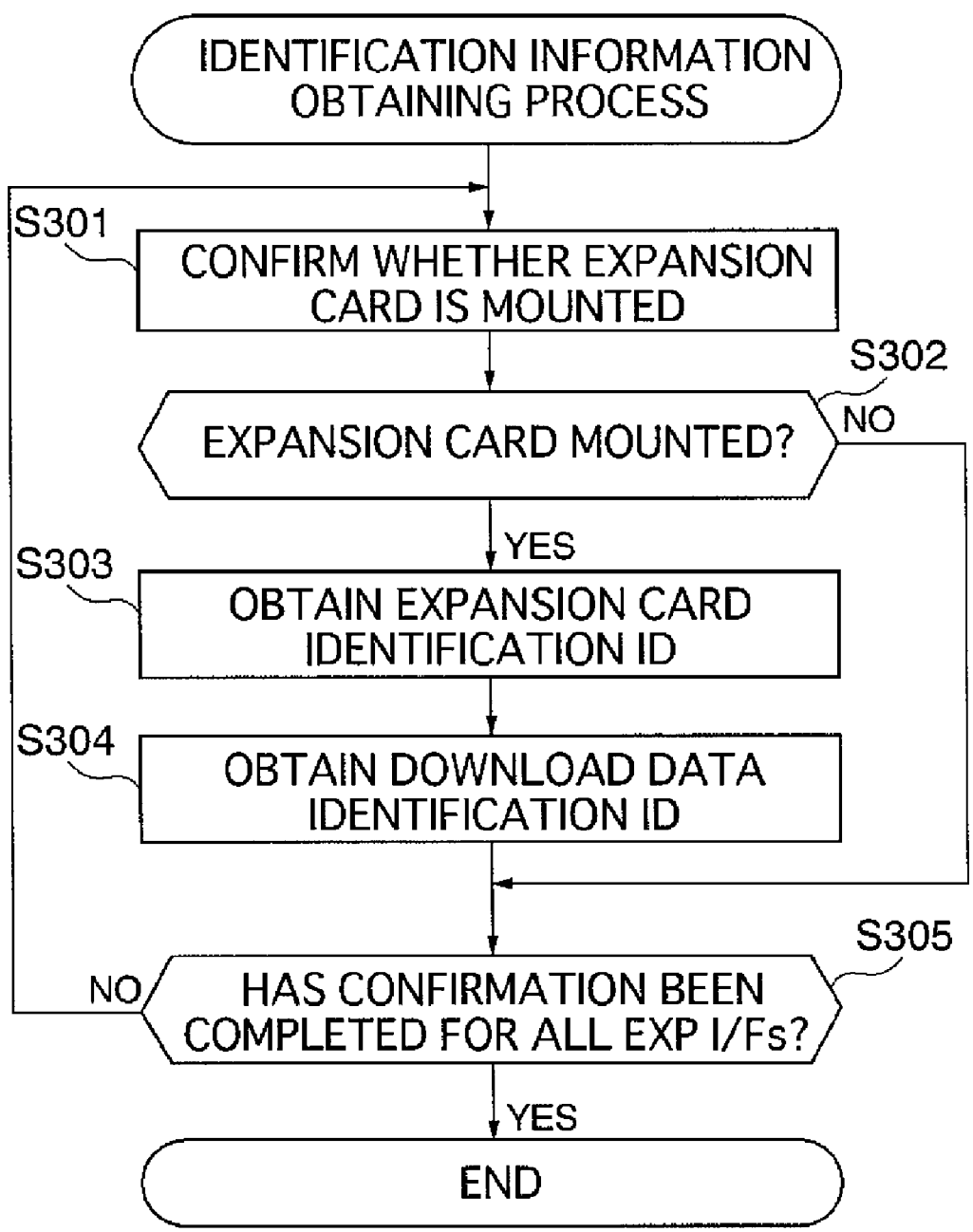
FIG. 3 is a flowchart showing the procedure of an expansion card identification ID/download data identification ID obtaining process executed by a controller section shown in FIG. 2.
Figure 5:
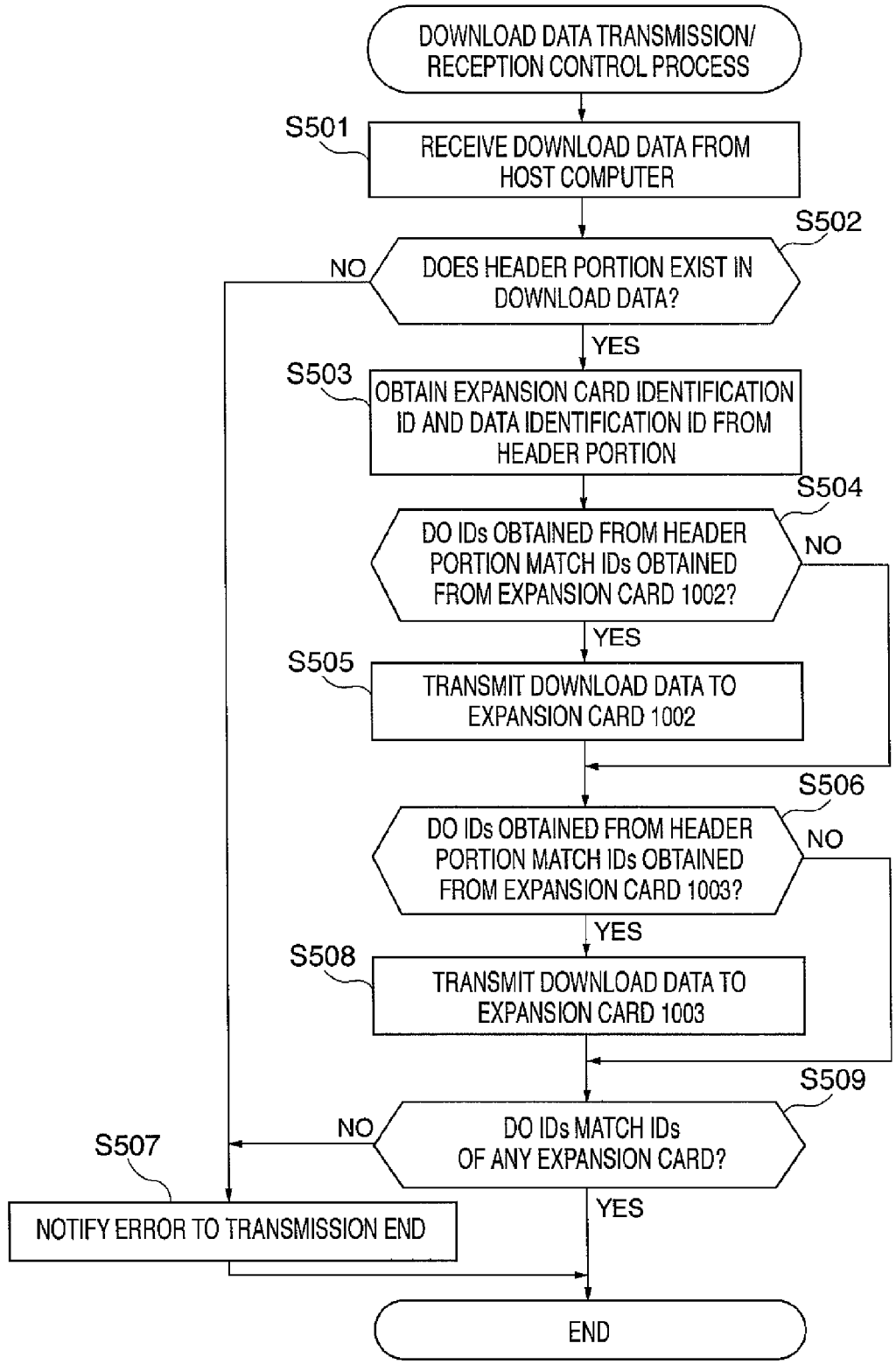
FIG. 5 is a flowchart showing the procedure of a download data transmission/reception control process executed by the controller section.

In the program area of the ROM 1006, the control program executed by the CPU 1007 is stored as described above. When the control program is executed, processes shown in FIGS. 3 and 5 are carried out, which will be described later. In a data area of the ROM 1006, font data, macro command data, form data, and the like used in generating output information to be outputted to the print engine section 1011 are stored.

A network interface (I/F) controller 1012 is connected to, e.g., the host computer 2000 shown in FIG. 1 via the Ethernet 100 and executes processing for communication with the host computer 2000 under the control by the CPU 1007. Further, the network interface controller 1012 is able to perform processing for receiving print data from, e.g., the host computer 2000 and to provide various information in the image forming apparatus 1000 to the host computer 2000 according to requests from the host computer 2000.

Figure 7:
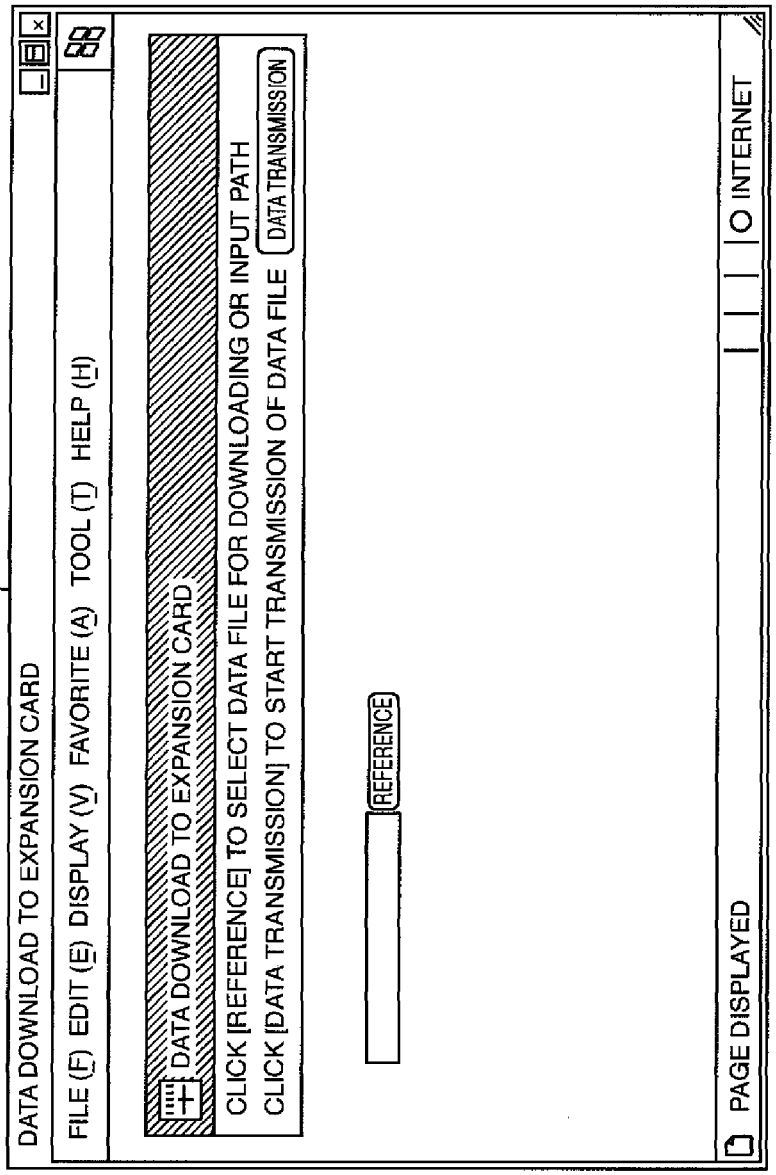
FIG. 7 is a view showing an example of a GUI displayed on a display section on a host computer by WEB browser application.

Further, the ROM 1006 stores WEB content data to be used for data transmission from the host computer 2000 and so on to the image forming apparatus 1000 by using an HTTP protocol (RFC1945, RFC2616). Typical WEB browser application running on a host computer reads the WEB content data from the ROM 1006 to display a WEB page shown in FIG. 7 on a display section (not shown) such as a liquid crystal monitor. This enables data transmission/reception using a GUI (Graphic User Interface).

A RAM 1008 is a memory functioning as a main memory, a work area, and the like of the CPU 1007, and a memory capacity of the RAM 1008 can be expanded by connecting an option RAM to an expansion port not shown. The RAM 1008 is also used as an output information development area. Further, being constituted by a NVRAM (nonvolatile random access memory) or the like, the RAM 1008 is used for storing various print setting information, network address setting information, and the like of the image forming apparatus 1000.

On an operation panel 1009, there are provided switches operable by a user, and displays, e.g. LED and LCD, for displaying the state and setting information of the image forming apparatus 1000.

The expansion card 1002 is connected to an EXP I/F 1004 via an EXP I/F connector (not shown). The expansion card 1003 is connected to an EXP I/F 1005 via an EXP I/F connector (not shown).

It should be noted that the number of the EXP I/Fs incorporated in the controller section 1001 is not limited to two as described in the present embodiment. Further, expansion cards connectable to the EXP I/Fs 1004, 1005 are not limited to the USB interface card and the wireless LAN interface card. These expansion cards may be any other communication medium-compatible interface card such as a PDL controller interface card, IEEE 1394—compatible interface card, and SCSI (Small Computer System Interface)—compatible interface card.

The expansion card 1002 is comprised of a ROM 1013, a USB host (HOST) controller 1014, a RAM 1015, a CPU 1016, and an EXP I/F 1017, all of which are interconnected by a system bus.

The CPU 1016 performs overall control of access to various control devices connected to the system bus based on, e.g., a control program stored in a program ROM area of the ROM 1013. Further, the CPU 1016 executes processing for communication with the controller section 1001 via the EXP I/F 1017 based on the control program and the like.

Further, the CPU 1016 is structured to be capable of controlling peripheral devices such as the IC card reader 300 shown in FIG. 1 via the USB host controller 1014, according to an instruction from the controller section 1001.

The control program executed by the CPU 1016 is stored in the ROM 1013, and when this control program is executed, processes shown in FIGS. 4 and 6, which will be described later, are executed. The RAM 1015 is a memory functioning as a main memory, a work area, and the like of the CPU 1016.

The expansion card 1003 is comprised of a RAM 1020, a CPU 1021, an EXP I/F 1022, a ROM 1018, and a wireless LAN controller 1019, all of which are interconnected by a system bus.

The CPU 1021 centrally controls accesses to various control devices connected to the system bus based on a control program and the like stored in a program ROM area of the ROM 1018. Further, the CPU 1021 executes processing for communication with the controller section 1001 via the EXP I/F 1022 based on the control program and the like.

Further, the CPU 1021 is structured to perform communication control so as to enable wireless network communication, e.g., between the controller section 1001 and the host computer 3000 shown in FIG. 1 connected via the wireless LAN controller 1019 to the wireless LAN network.

The control program executed by the CPU 1021 is stored in the ROM 1018, and when the control program is executed, the process shown in FIG. 4, which will be described later, is executed. The RAM 1020 functions as a main memory, a work area, and the like of the CPU 1021.

Next, a description will be given of a control process in the image forming apparatus 1000 in a case where an expansion card identification ID and a download data identification ID are obtained from each of expansion cards mounted to the image forming apparatus.

FIG. 3 is a flowchart showing the procedure of an expansion card identification ID/download data identification ID obtaining process executed by the controller section 1001 shown in FIG. 2. The present process is realized by the CPU 1007 reading and executing the control program stored in the ROM 1006 in the controller section 1001.

Upon start of operation of the image forming apparatus 1000, the controller section 1001 confirms in a step S301 whether or not an expansion card is mounted in at least one of the EXP I/Fs 1004, 1005 in the controller section 1001.

As a result of the confirmation in the step S301, if an expansion card is not mounted in either of the EXP I/Fs 1004, 1005, the process proceeds to a step S305. On the other hand, if an expansion card is currently mounted in at least one of the EXP I/Fs 1004, 1005, the process proceeds to a step S303. In the step S303, the controller section 1001 transmits a request for acquisition of expansion card identification ID to the currently mounted expansion card to obtain an expansion card identification ID from the expansion card. Such expansion card identification ID is information for identifying an associated expansion card. For example, the expansion card identification ID is "USB1001" if the expansion card is a USB interface card, and is "WLAN002" if the expansion card is a wireless LAN interface card. It should be noted that any expansion card identification ID may be used so far as it can uniquely identify the kind of the expansion card concerned. Thus, the expansion card identification ID is not limited in format or value. It should be also noted that, though the expansion card identification ID is stored in the ROM 1013 or the ROM 1018, this is not restrictive.

Next, in a step S304, the controller section 1001 transmits a request for acquisition of download data identification ID to the currently mounted expansion card to obtain a download data identification ID from the expansion card. Such download data identification ID is information for identifying data receivable as download data. For example, the download data identification ID is "firmware" if the download data is program data for expansion card, and "card configuration" if the download data is information for expansion card setting. It should be noted that any download data identification ID may be used so far as it can uniquely identify the kind of data that can be downloaded to the expansion card, and thus the download data identification ID is not limited in format or value. It should be also noted that, though the download data identification ID is stored in the ROM 1013 or the ROM 1018, this is not restrictive.

Next, in the step S305, the controller section 1001 determines whether or not the confirmation of the expansion card being mounted or not being mounted has been completed for all the EXP I/Fs in the controller section 1001. If the confirmation has not been completed, the processes from the steps S301 to S304 are repeated until the confirmation is completed.

Next, a description will be given of a control process in a case where each of the expansion cards transmits the expansion card identification ID and the download data identification ID to the controller section 1001 in response to the requests for acquisition transmitted from the controller section 1001 in the steps S303 and S304 in FIG. 3.

Figure 4:
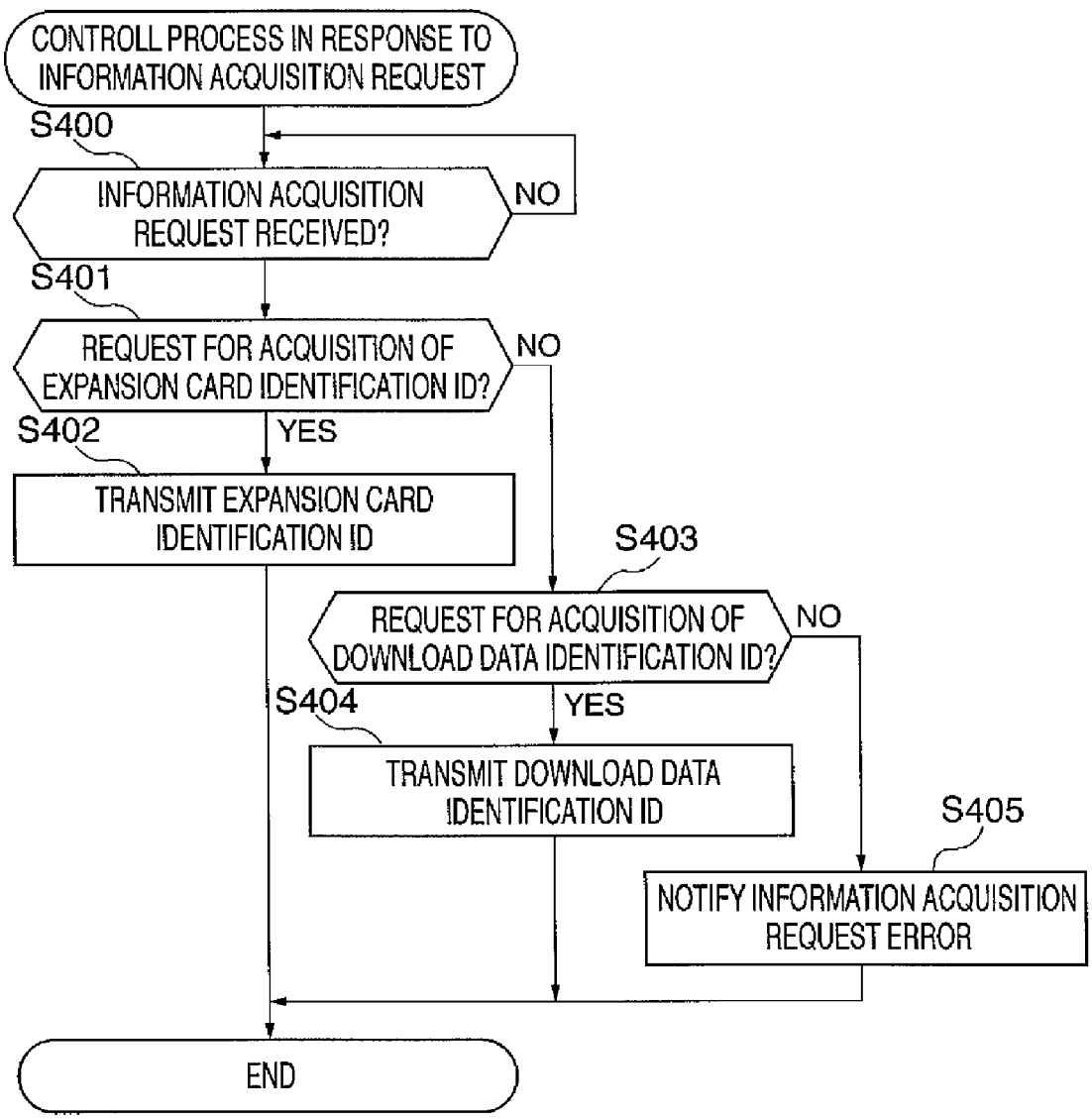
FIG. 4 is a flowchart showing the procedure of a control process executed by expansion cards shown in FIG. 2 in response to requests for acquisition of expansion card identification ID and download data identification ID.

FIG. 4 is a flowchart showing the procedure of a control process executed by the expansion cards 1002, 1003 shown in FIG. 2 in response to requests for acquisition of expansion card identification ID and download data identification ID. The present process is realized by the CPU 1016 and the CPU 1021 reading and executing the control programs stored in the ROM 1013 in the expansion card 1002 and in the ROM 1018 in the expansion card 1003, respectively. Here, in the embodiment described below, a case where the expansion card 1002 receives the requests for acquisition from the controller section 1001 will be described, but in a case where the expansion card 1003 receives the requests for acquisition, the same process is executed.

First, when receiving an information acquisition request from the controller section 1001 (YES to a step S400), the expansion card 1002 determines in a step S401 whether or not the information acquisition request received from the controller section 1001 is a request for acquisition of expansion card identification ID. If the information acquisition request received from the controller section 1001 is not a request for acquisition of expansion card identification ID, the process proceeds to a step S403, on the other hand, if the information acquisition request received from the controller section 1001 is a request for acquisition of expansion card identification ID, the process proceeds to a step S402.

In the step S402, the expansion card 1002 transmits the own expansion card identification ID to the controller section 1001, and the present process is terminated.

In the step S403, the expansion card 1002 determines whether or not the information acquisition request received from the controller section 1001 is a request for acquisition of download data identification ID. If the information acquisition request is a request for acquisition of download data identification ID, the process proceeds to a step S404. In the step S404, the expansion card 1002 transmits the own download data identification ID to the controller section 1001, and the present process is terminated.

On the other hand, as a result of the determination in the step S403, if the information acquisition request is not a request for acquisition of download data identification ID, the process proceeds to a step S405. In the step S405, the expansion card 1002 notifies an error indicating an unauthorized information acquisition request to the controller section 1001, and the present process is terminated.

Next, a description will be given of a control process in a case where the controller section 1001 receives download data for expansion card transmitted from the host computer 2000 or 2001 or the like and transmits the received download data to an associated expansion card.

FIG. 5 is a flowchart showing the procedure of a download data transmission/reception control process executed by the controller section 1001. The present process is realized by the CPU 1007 reading and executing the control program stored in the ROM 1006 in the controller section 1001. A case where the download data is received from the host computer 2000 will be described.

In FIG. 5, first in a step S501, the controller section 1001 receives download data for expansion card transmitted by the host computer 2000. A concrete flow in executing this reception process is as follows.

Before transmitting the download data to the controller section 1001, the host computer 2000 requests the controller section 1001 to transmit WEB content data.

In response to the above request, the controller section 1001 transmits WEB content data stored in the ROM 1006 to the host computer 2000. When receiving the WEB content data from the controller section 1001, the host computer 2000 displays a GUI 700 shown in FIG. 7 on the display section based on the received WEB content data.

Thereafter, a user designates a data file to be transmitted, by pressing a reference button in the GUI 700 or inputting a path of the data file. Thereafter, when the user presses a data transmission button, the host computer 2000 transmits the data file designated by the user as download data to the controller section 1001. When receiving the data file, the controller section 1001 sets the received data file as download data for expansion card.

Figure 8:
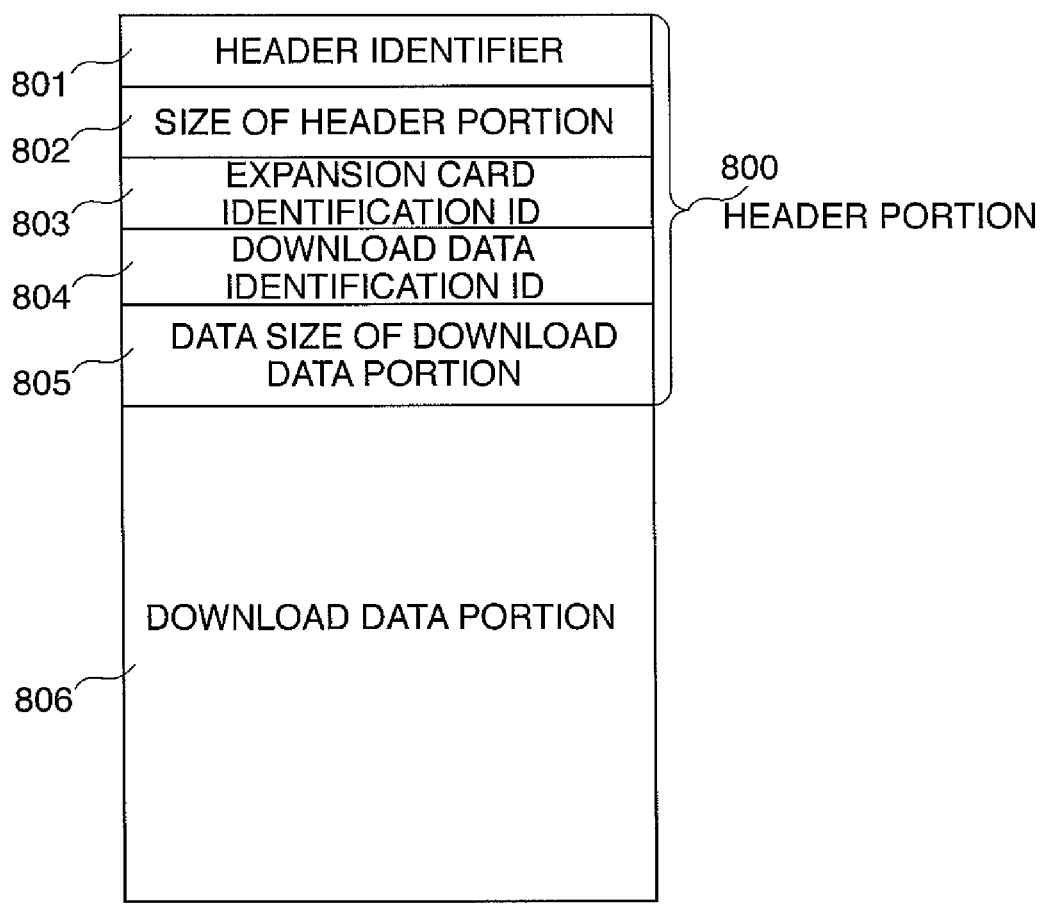
FIG. 8 is a view showing an example of a format of data receivable as download data by various kinds of expansion cards.

As shown in FIG. 8, download data capable of being received by expansion cards has a format composed of a header portion 800 and a download data portion 806. The header portion 800 is comprised of an area 801 in which an identifier for identifying the header portion 800 is stored, an area 802 indicating data size of the header portion 800, and an area 803 indicating expansion card identification IDs of expansion cards capable of receiving the download data.

The header portion 800 is further comprised of an area 804 in which the download data identification ID is stored and an area 805 in which is stored information on data size of a download data portion 806 subsequent to the header portion 800. In the download data portion 806, program data and setting information are stored.

Therefore, the controller section 1001 executes a process of a step S502 described below, to thereby determine whether or not the data received by the controller section 1001 in the step S502 and set as the download data for expansion card has a format conforming to that of the download data capable of being received by expansion cards.

More specifically, in the step S502, the controller section 1001 determines whether or not the header portion 800 (FIG. 8) exists in the received download data.

As a result of the determination in the step S502, if the received download data does not include the header portion 800, the process proceeds to a step S507. On the other hand, if the received download data includes the header portion 800, the process proceeds to a step S503. In the step S503, the controller section 1001 obtains the expansion card identification ID and the download data identification ID respectively from the areas 803 and 804 according to the format of the header portion 800 of the received download data.

Next, in a step S504, the controller section 1001 determines whether or not the expansion card identification ID and the download data identification ID obtained from the expansion card 1002 match those obtained from the download data. If the IDs obtained from the expansion card 1002 and the IDs obtained from the download data do not match each other, the process proceeds to a step S506. On the other hand, if the IDs match each other, the process proceeds to a step S505.

In the step S505, the controller section 1001 transmits the download data to the expansion card 1002. Thereafter, the process proceeds to the step S506.

Next, in the step S506, the controller section 1001 determines whether or not the expansion card identification ID and the download data identification ID obtained from the expansion card 1003 match those obtained from the download data. If the IDs obtained from the expansion card 1003 and the IDs obtained from the download data do not match each other, the process proceeds to a step S509. On the other hand, if the IDs match each other, the process proceeds to a step S508. In the step S508, the controller section 1001 transmits the download data to the expansion card 1003. Consequently, it is possible to specify an expansion card as a transfer destination of the download data. Furthermore, in a case where currently mounted expansion cards include a plurality of expansion cards each having an expansion card ID and a download data ID that match the IDs obtained from the download data, the download data can be transmitted to all the expansion cards having the matching IDs. In the step S509, the controller section 1001 determines whether or not the expansion card identification ID and the download data identification ID obtained from the download data match the IDs obtained from any of the expansion cards. If the IDs match none of the IDs obtained from the expansion cards, the process proceeds to a step S507.

In the step S507, the controller section 1001 notifies an error to the host computer 2000 as a transmission end of the download data, and the procedure terminates.

Next, a description will be given of a control process in a case where the expansion card 1002 receives firmware program data or setting information for the expansion card 1002 and updates data in the expansion card 1002 with the received firmware program or setting information. The firmware program data and the setting information are examples of download data transmitted from the controller section 1001 in the image forming apparatus 1000 to expansion cards. Though the process in the expansion card 1002 will be described in the present embodiment, it should be noted that the same process is also executed in the expansion card 1003.

Figure 6:
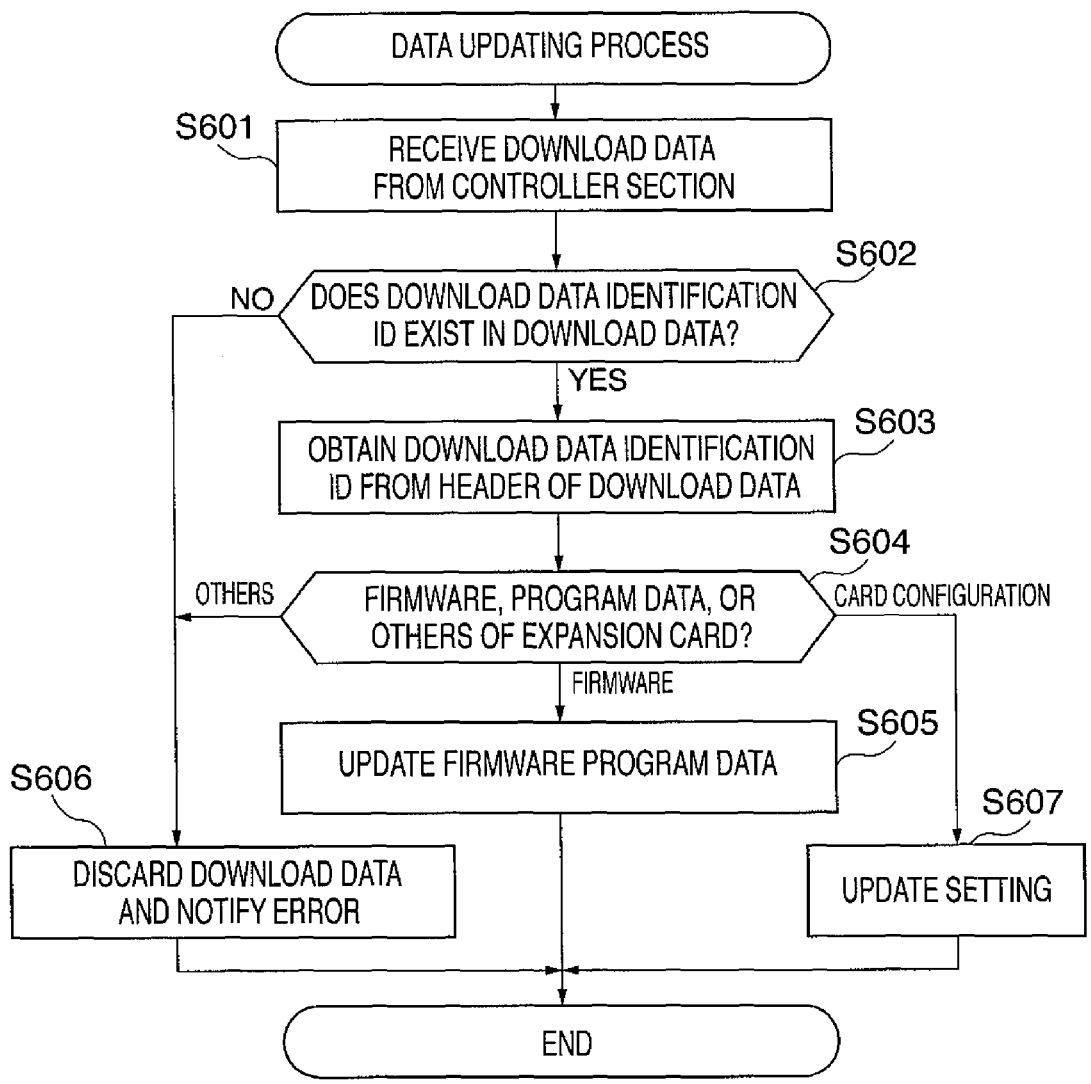
FIG. 6 is a flowchart showing the procedure of a data update process of updating a firmware program, executed by the expansion cards.

FIG. 6 is a flowchart showing the procedure of a data update process of updating the firmware program, executed by the expansion card 1002.

In FIG. 6, first, in the step S601, the expansion card 1002 receives the download data from the controller section 1001.

Next in a step S602, in a case where the download data identification ID exists in the received download data, that is, information is stored in the area 804 in the header portion 800 of the download data, the process proceeds to a step S603. On the other hand, in a case where the header portion 800 does not exist in the download data, the process proceeds to a step S606. In the step S603, the expansion card 1002 obtains the download data identification ID from the area 804 in the header portion 800.

Next in a step S604, the expansion card 1002 determines the kind of the obtained download data identification ID, that is, whether the kind is "firmware", "card configuration", or others. The "firmware" is a character string indicating that the received download data is firmware program data. The "card configuration" is a character string indicating that the download data is setting information.

As a result of the determination in the step S604, if the kind of the download data identification ID is "firmware", the expansion card 1002 stores the firmware program data in the ROM 1013 to update the firmware program data in the step S605. Then, the present process is finished. If the kind of the obtained download data identification ID is "card configuration", the expansion card 1002 updates the setting of the expansion card in a step S607 based on the received setting information.

On the other hand, if the kind of the download data identification ID is determined neither "firmware" nor "card configuration", the process proceeds to the step S606.

In the step S606, the expansion card 1002 discards the received download data as well as notifies an error to the controller section 1001, and the procedure terminates.

According to the above-described embodiment, the image forming apparatus 1000 obtains the expansion card identification ID and the download data identification ID from each of the expansion cards 1002, 1003 mounted in the EXP I/Fs 1004, 1005 respectively.

When receiving the download data from the host computer 2000 or the like, the image forming apparatus 1000 obtains the expansion card identification ID and the download data identification ID from the header portion 800 of the received data.

Further, the image forming apparatus 1000 obtains sets of expansion card identification ID and download data identification ID from respective ones of the mounted expansion cards. When a set of the IDs obtained from the download data match a set of the IDs obtained from any of the expansion cards, the image forming apparatus 1000 transmits the download data to the relevant expansion card. Consequently, even when a plurality of expansion cards (information processing devices) are mountable in the data processing apparatus, respective data in the expansion cards can be updated based on respective ones of data received from an external apparatus such as the host computer 2000 without making any change to the control program in the image forming apparatus 1000.

Further, when the download data for expansion card (information processing device) is received from a remote host, the controller section 1001 controls data reception from the remote host. Consequently, it is not necessary for each individual expansion card (information processing device) to have a control and communication interface for control of data reception from the remote host, and as a result, it is possible to reduce manufacturing cost of the expansion card (information processing device).

Moreover, in response to an information acquisition request transmitted from the controller section 1001 in the image formatting apparatus 1000, a corresponding one of the expansion cards 1002 and 1003 transmits the expansion card identification ID and the download data identification ID to the controller section 1001. Further, when receiving the download data from the controller section 1001, the expansion card 1002 or 1003, whichever is concerned, obtains the download data identification ID from the header portion 800 of the received data.

Then, when the download data is the firmware program data, the firmware program data stored in the ROM 1013 or 1020 in expansion card 1002 or 1003, whichever is concerned, is updated. In a case where the download data is the setting information, the settings of the expansion card 1002 or 1003 is updated. Consequently, similarly to the aforesaid effect, it is possible to easily update data in the expansion cards 1002, 1003 based on data received from an external apparatus such as the host computer 2000, without making any change to the control program in the image forming apparatus 1000.

The above-described embodiment shows the example where when it is determined at the step S504 in FIG. 5 that there exist a plurality of expansion cards capable of receiving the download data received by the controller section 1001 of the image forming apparatus 1000 from the host computer 2000 or the like, the download data is transmitted to all the expansion cards capable of receiving the download data.

However, in a case where it is determined in the step S504 that there exist a plurality of expansion cards capable of receiving the download data, a step causing a user operating the host computer 2000 or the like to select an expansion card as a destination of the download data may be added in place of the steps S505 to S509. In this case, the controller section 1001 receives the result of the user's selection and transmits the download data only to the expansion card selected by the user. Consequently, it is possible to improve convenience of users.

Further, in the above-described embodiment, data to be downloaded is selected on a screen displayed on the display section on the host computer 2000 or the like. However, data receivable as the download data may be obtained from the host computer 2000 or the like by executing a control program in the expansion card. In this case, it is possible to obtain the receivable download data by inputting the kind of the expansion card via a screen displayed on the operation panel 1009 on the image forming apparatus 1000.

It goes without saying that the object of the present invention may also be accomplished by supplying a system or an apparatus with a storage medium (or a recording medium) in which a program code of software, which realizes the functions of the above described embodiment is stored, and causing a computer (or CPU or MPU) of the system or apparatus to read out and execute the program code stored in the storage medium.

In this case, the program code itself read from the storage medium realizes the functions of the above described embodiment, and hence the program code and a storage medium on which the program code is stored constitute the present invention.

Further, it is to be understood that the functions of the above described embodiment may be accomplished not only by executing the program code read out by a computer, but also by causing an OS (operating system) or the like which operates on the computer to perform a part or all of the actual operations based on instructions of the program code.

Further, it is to be understood that the functions of the above described embodiment may be accomplished by writing the program code read out from the storage medium into a memory provided in an expansion board inserted into a computer or a memory provided in an expansion unit connected to the computer and then causing a CPU or the like provided in the expansion board or the expansion unit to perform a part or all of the actual operations based on instructions of the program code.

Further, the above program has only to realize the functions of the above-mentioned embodiment on a computer, and the form of the program may be an object code, a program executed by an interpreter, or script data supplied to an OS.

Examples of the storage medium for supplying the program code include a floppy (registered trademark) disk, a hard disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program is supplied by downloading from another computer, a database, or the like, not shown, connected to the Internet, a commercial network, a local area network, or the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-252341 filed Aug. 31, 2005, which is hereby incorporated by reference herein in its entirety.

What is claimed is:

1. A data processing apparatus comprising:
an interface to which at least one information processing device is connectable, wherein the one information processing device is a communication device for communicating with another communication device;
a device identification information obtaining unit that obtains, from an information processing device connected to the interface, first device identification information for identifying the information processing device connected to the interface;
a data reception unit that receives data from an external apparatus;
a data information obtaining unit that obtains, from the information processing device connected to the interface, first data information associated with data downloadable to the information processing device, which is different from the first device identification information; and
a data transmission unit that transmits the data received by said data reception unit to the information processing device connected to the interface when the first device identification information obtained by said device identification information obtaining unit and second device identification information provided with the data received by said data reception unit match each other and the first data information obtained by said data information obtaining unit and the second data identification information provided with the data received by said data reception unit match each other.

2. A data processing apparatus according to claim 1, wherein the communication device communicates with another communication device using a wireless communication method.

3. A data processing apparatus according to claim 1, wherein the data includes program data for controlling the information processing device connected to the interface.

4. A data processing apparatus according to claim 1, wherein the data include setting information for setting the information processing device connected to the interface.

5. A control method for data processing apparatus comprising the steps of:
connecting at least one information processing device to an interface, wherein the information processing device is a communication device for communicating with another communication device;
obtaining with a device identification information obtaining unit, from an information processing device connected to the interface, first device identification information for identifying the information processing device connected to the interface;
receiving the data from an external apparatus with a data reception unit;
obtaining with a data information obtaining unit, from the information processing device connected to the interface, first data information associated with data downloadable to the information processing device, which is different from the first device identification information;
transmitting with a data transmission unit the data received by said data reception unit to the information processing device connected to the interface when the first device identification information obtained by said device identification information obtaining unit and second device identification information provided with the data received by said data reception unit match each other and the first information obtained by said data information unit and second data information provided with the data received by said data reception unit match each other.

6. A method according to claim 5, wherein the communication device communicates with the another communication device using a wireless communication method.

7. A method according to claim 5, wherein the data includes program data for controlling the information processing device connected to the interface.

8. A method according to claim 5, wherein the data include setting information for setting the information processing device connected to the interface.

9. A data processing apparatus according to claim 1, further comprising a notification unit that notifies an error to the external apparatus when the first device identification information and the second device identification information do not match each other.

10. A data processing apparatus according to claim 1, wherein the information processing device is an expansion card.

11. A method according to claim 5, further comprising the step of notifying an error to the external apparatus when the first device identification information and the second device identification information do not match each other.

12. A method according to claim 5, wherein the information processing device is an expansion card.

13. A non-transitory computer-readable storage medium storing a program executable by a processor of a data processing apparatus to execute a method of controlling the data processing apparatus, the method comprising the steps of:

connecting at least one information processing device to an interface, wherein the information processing device is a communication device for communicating with another communication device;

obtaining with a device identification information obtaining unit, from an information processing device connected to the interface, first device identification information for identifying the information processing device connected to the interface;

receiving the data from an external apparatus with a data reception unit;

obtaining with a data information obtaining unit, from the information processing device connected to the interface, first data information associated with data downloadable to the information processing device, which is different from the first device identification information;

transmitting with a data transmission unit the data received by said data reception unit to the information processing device connected to the interface when the first device identification information obtained by said device identification information obtaining unit and second device identification information provided with the data received by said data reception unit match each other and the first data information obtained by said data information obtaining unit and second data information provided with the data received by said data reception unit match each other.

14. A non-transitory computer-readable storage medium according to claim 13, wherein the communication device communicates with the another communication device using a wireless communication method.

15. A non-transitory computer-readable storage medium according to claim 13, wherein the data includes program data for controlling the information processing device connected to the interface.

16. A non-transitory computer-readable storage medium according to claim 13, wherein the data includes setting information for setting the information processing device connected to the interface.

17. A non-transitory computer-readable storage medium according to claim 13, wherein the method further comprises the step of notifying an error to the external apparatus when the first device identification information and the second device identification information do not match each other.

18. A non-transitory computer-readable storage medium according to claim 13, wherein the information processing device is an expansion card.

* * * * *